(12) United States Patent
Tatsumi et al.

(10) Patent No.: US 7,548,655 B2
(45) Date of Patent: Jun. 16, 2009

(54) IMAGE STILL AREA DETERMINATION DEVICE

(75) Inventors: Masahiro Tatsumi, Kawasaki (JP); Masayuki Tsuji, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 625 days.

(21) Appl. No.: 11/207,903

(22) Filed: Aug. 22, 2005

(65) Prior Publication Data

US 2006/0274158 A1    Dec. 7, 2006

(30) Foreign Application Priority Data

May 19, 2005  (JP) .............................. 2005-146700

(51) Int. Cl.
*G06K 9/36* (2006.01)
(52) U.S. Cl. ...................................... 382/236
(58) Field of Classification Search ......... 382/232–233, 382/236, 238–240, 244–248, 250–251; 348/394.1–395.1, 348/400.1–404.1, 408.1–416.1, 420.1–421.1, 348/430.1–431.1; 375/240.02–240.07, 240.1–240.27
See application file for complete search history.

(56) References Cited

U.S. PATENT DOCUMENTS 4,890,161 A * 12/1989 Kondo ................... 375/240.24

FOREIGN PATENT DOCUMENTS

JP    2000-078533    3/2000

* cited by examiner

*Primary Examiner*—Jose L Couso
(74) *Attorney, Agent, or Firm*—Fujitsu Patent Center

(57) ABSTRACT

In order to reduce the flicker and blur of a result obtained by, for example, converting an interlace scan image into a progressive scan image, an image still area determination device comprises a unit for calculating the average value of the values of the relevant pixel and pixels adjacent to the pixel in each of the current frame image and a frame image immediately before it, a unit for calculating a difference between the average values of a pair of pixels located in the same position of each of two frame images and a unit for determining a still area in each of the two frame images, using its output and a predetermined threshold value.

6 Claims, 14 Drawing Sheets

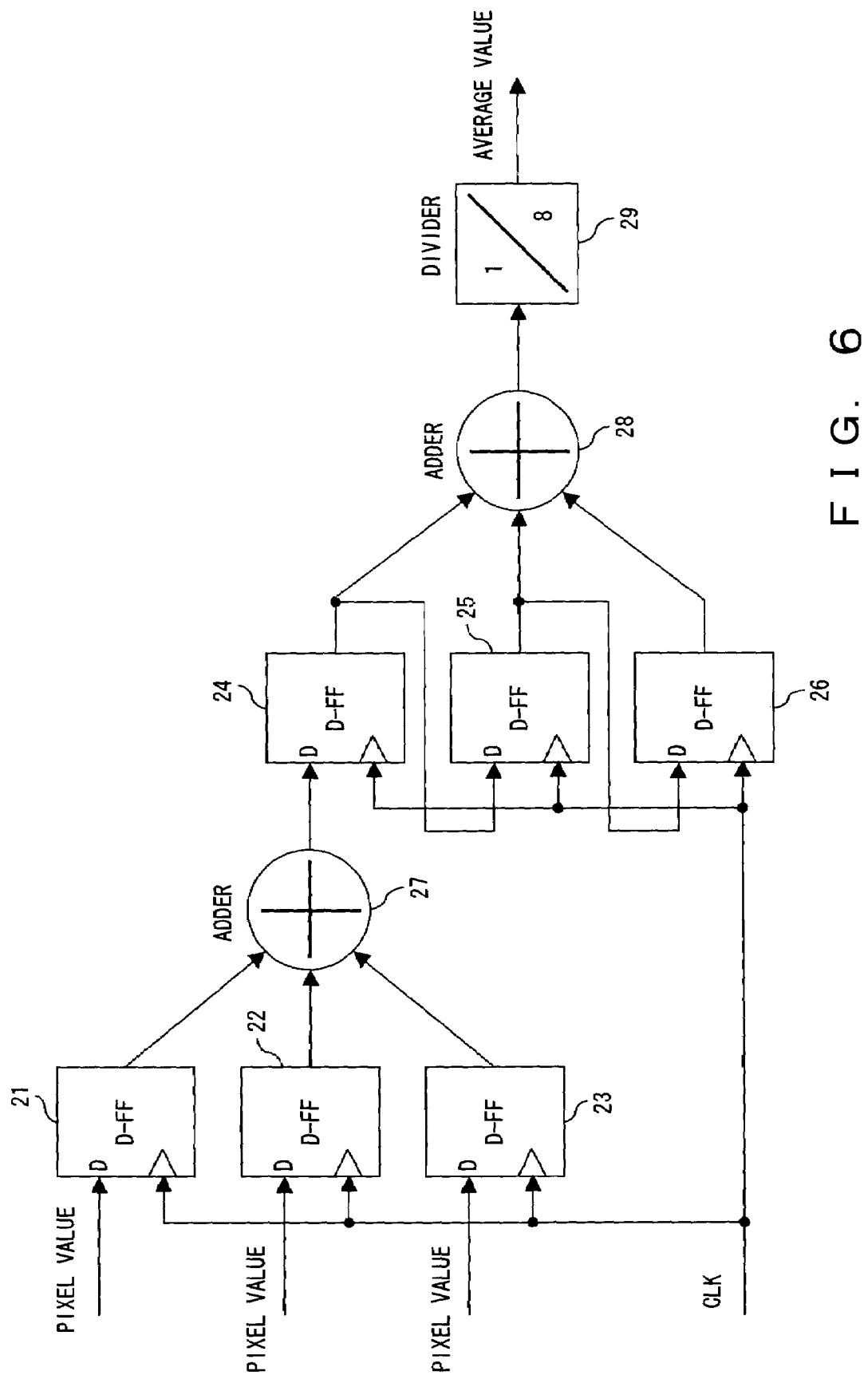
F I G. 6

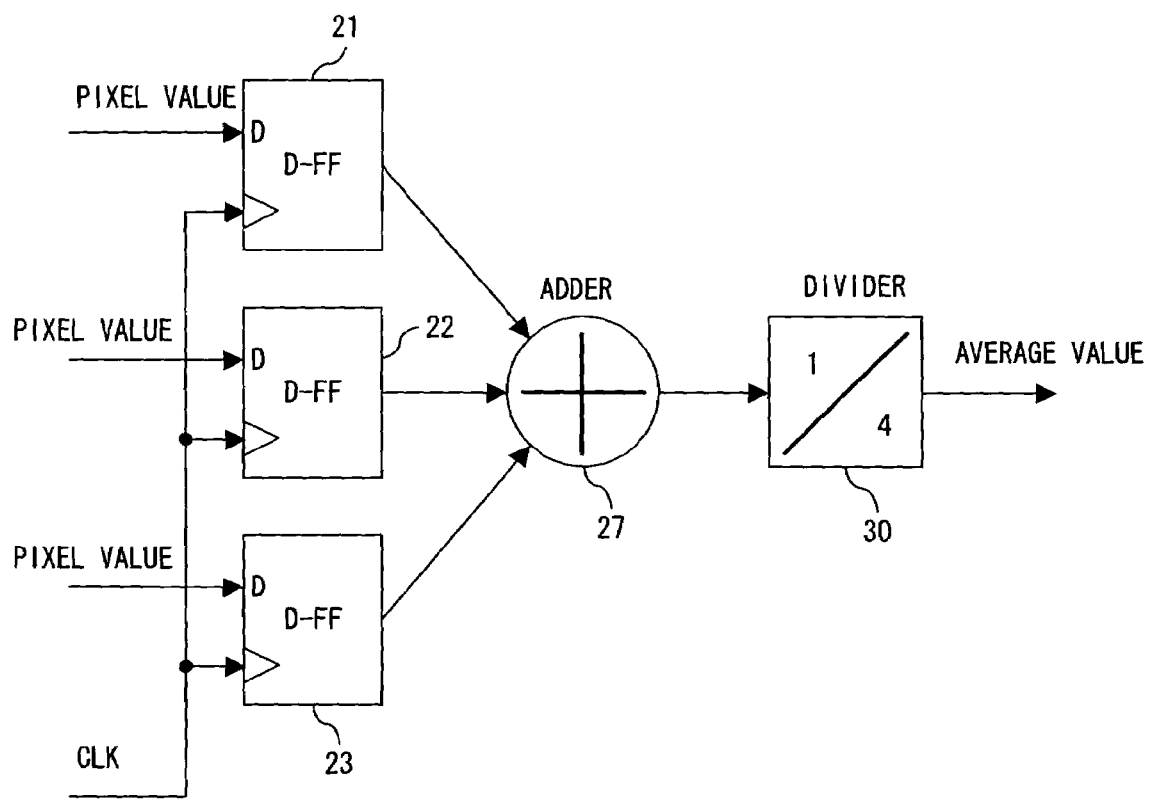
F I G. 10

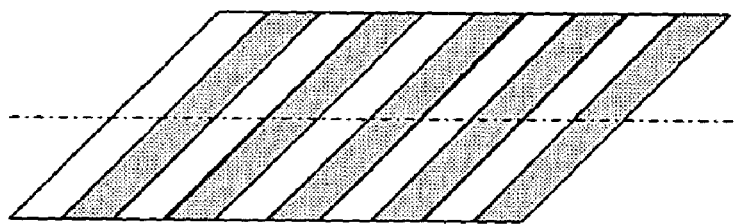
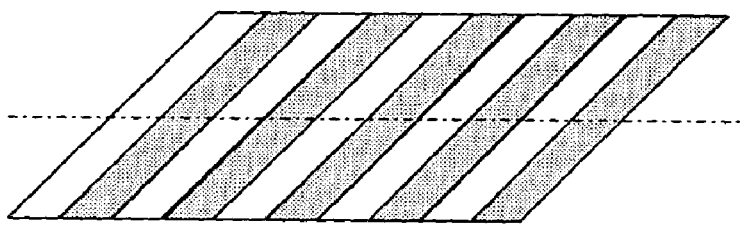
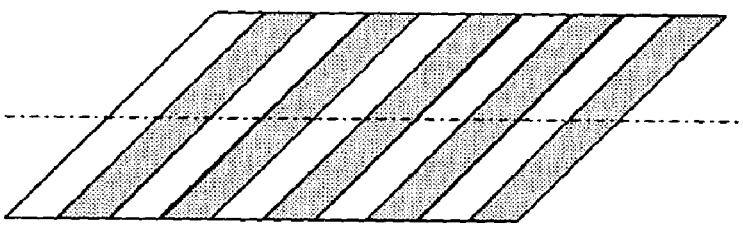
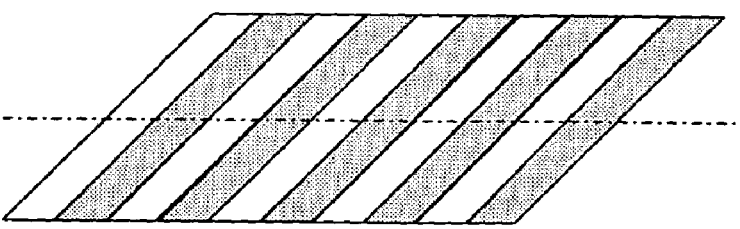
FIG. 13

IMAGE STILL AREA DETERMINATION DEVICE

CROSS-REFERENCE TO RELATED APPLICATIONS

This application is based upon and claims the benefit of priority from the prior Japanese Patent Application No. 2005-146700 filed on May 19, 2005, the entire contents of which are incorporated herein by reference.

BACKGROUND OF THE INVENTION

1. Field of the Invention

The present invention relates to the processing method of a video image or the like, and more particularly relates to an image still area determination device for determining the still area of each block or the like when converting an interlace scan type field image into a progressive scan type frame image or the like.

2. Description of the Related Art

For example, in a video signal processing device, it is important in efficient signal processing to determine still areas between consecutive frames. For example, it is important to determine still areas in order to prevent the flicker and blur of an image when converting an interlace scan type field image into a progressive scan type frame image.

The prior art of this still area determination method is described below with reference to FIGS. 1 and 2. FIG. 1 shows the configuration of the conventional image still area determination device. The determination device shown in FIG. 1 comprises a pixel value difference extraction unit 100 for calculating the pixel value difference between the corresponding pixels of two frame images when the current frame image and a frame image immediately before it are inputted, a block averaging unit 101 for averaging the pixel value differences of the pixels of each block and a block stillness determination unit 102 for determining the stillness of a block, comparing the output of the block averaging unit 101 with a predetermined threshold value.

FIG. 2 explains the still area determining operation for each block of the image still area determination device shown in FIG. 1. This still area determination process is applied to the block composed of 2×2 pixels enclosed by a solid line in the center of FIG. 2, of each of the current frame image and a frame image immediately before it. However, when determining block stillness between pixel blocks each composed of 2×2 pixels, the pixel value difference extraction unit 100 calculates the pixel value difference between each pair of corresponding pixels in a square area with 4×4 pixels including one pixel around the block (enclosed by a dotted line), of the current frame image and the frame image immediately before it. Then, the block averaging unit 101 calculates the average value of the 16 difference values and provides the block stillness determination unit 102 with the value as an average value of the block composed of 2×2 pixels. If this value is smaller than the threshold value, the block is determined to be a still area, and a signal for the determination result is outputted.

However, as described with reference to FIG. 2, in such a conventional method, since a pixel value difference is calculated between directly corresponding pixels, even a small imperceptible movement causes a difference between pixel values, and as a result, sometimes a block which should be determined to be still area is not determined so. In such a case, for example, flicker occurs in a progressive scan type frame image converted from an interlace scan type field image.

In one of such conventional methods of detecting a still area in an image (for example, Patent reference 1), for example, a reliable still area detection algorithm for calculating a pixel value difference between corresponding pixels of consecutive frames, deleting an isolated still area or adjacent small blocks of still areas on a temporary map of a still area which are generated by accumulating pixel value differences of each block, based on the calculated value in order to calculate the final map of an still area is disclosed.

However, even in Patent reference 1, since a pixel value difference is calculated between directly corresponding pixels of consecutive frames, a pixel value difference caused by a small image movement affects the determination of a still area and its image signal processing causes flicker and blur.

Patent reference 1: Japanese laid-open disclosure public patent bulletin No. 2000-78533

SUMMARY OF THE INVENTION

It is an object of the present invention to calculate the average value of values of not only a pixel but also pixels including adjacent pixels and to calculate a difference between the average values, instead of only using the pixel values of corresponding pixels in order to reduce flicker and blur caused by image signal processing when calculating a pixel value difference between consecutive frames.

The image still area determination device of the present invention comprises an adjacent pixel value averaging unit, a pixel value difference extraction unit and a still area determination unit.

According to the present invention, when calculating a pixel value difference between a pair of corresponding pixels between the current frame image and a frame image immediately before it, the average value of the values of not only the pixel itself but also pixels including adjacent pixels is calculated, and the difference between the average values is calculated.

According to the present invention, since for example, the values of three pixels including a target pixel and its right- and left-hand pixels are averaged and compared, instead of only comparing pixel values between corresponding pixels of two frames when determining a still area of an image, and an oversensitive-reaction such that a still area is not determined to be so because of a small imperceptible movement can be prevented, thereby reducing flicker and blur due to the image processing of a still area.

BRIEF DESCRIPTION OF THE DRAWINGS

FIG. 6 shows the configuration of the adjacent pixel value averaging unit of the first preferred embodiment.

FIG. 10 shows the configuration of the adjacent pixel value averaging unit of the second preferred embodiment.

FIG. 13 explains a progressive scan type frame image.

DESCRIPTION OF THE PREFERRED EMBODIMENT

Figure 3:
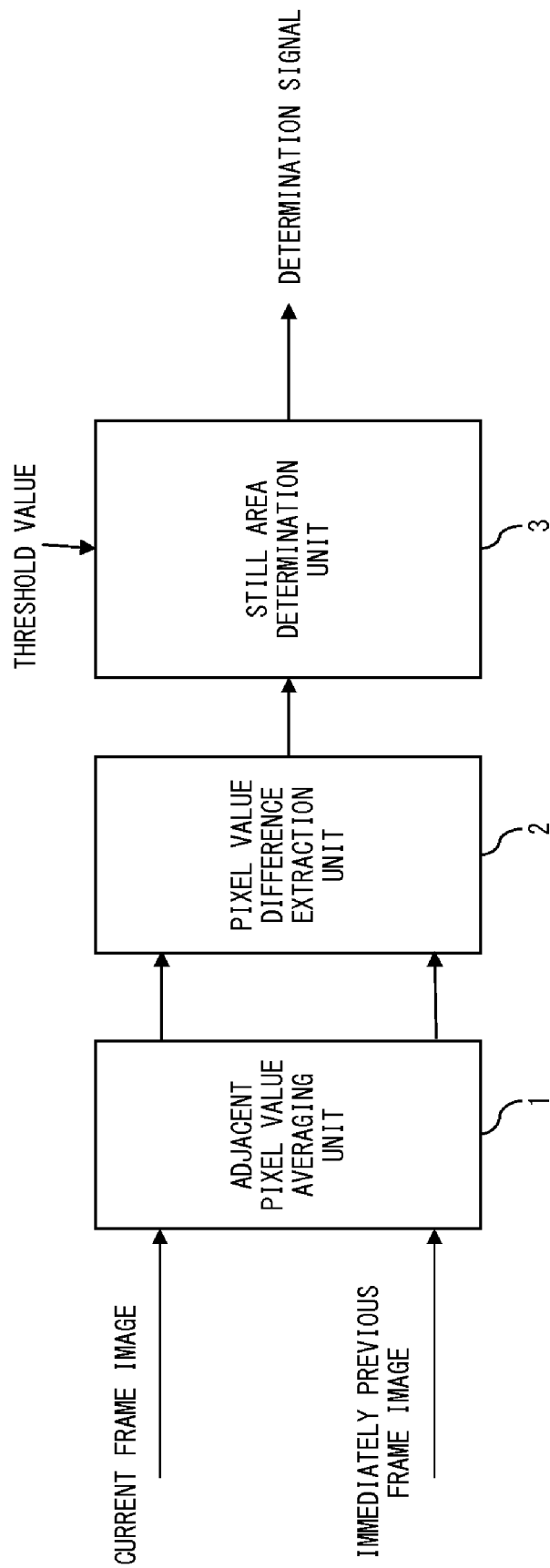
FIG. 3 shows the basic configuration of the image still area determination device of the present invention.

FIG. 3 shows the basic configuration of the image still area determination device of the present invention. The image still area determination device of the present invention comprises an adjacent pixel value averaging unit 1, a pixel value difference extraction unit 2 and a still area determination unit 3.

The adjacent pixel value averaging unit 1 calculates the average value of the values of adjacent pixels including the relevant pixel of two frames when the current frame image and a frame image immediately before it are inputted. In the preferred embodiment of the present invention, for example, the average value of the values of pixels including eight pixels adjacent to one pixel on a pixel plane is calculated. Alternatively, the average value of the values of pixels including a pair of right- and left-hand pixels adjacent to one pixel on a pixel plane can be calculated.

The pixel value difference extraction unit 2 calculates a difference between the average values of the above-mentioned pixel values of each pixel in the same position of each of the two frames. The still area determination unit 3 determines the still areas of each of the two frames, using the output of the pixel value difference extraction unit, based on the provided threshold value. For example, the still area determination unit determines the still areas of each block composed of a plurality of pixels.

As described above, according to the present invention, when calculating a pixel value difference between a pair of corresponding pixels between the current frame image and the frame image immediately before it, the average value of the values of pixels including adjacent pixels is calculated, and the difference between the average values is calculated.

Figure 4:
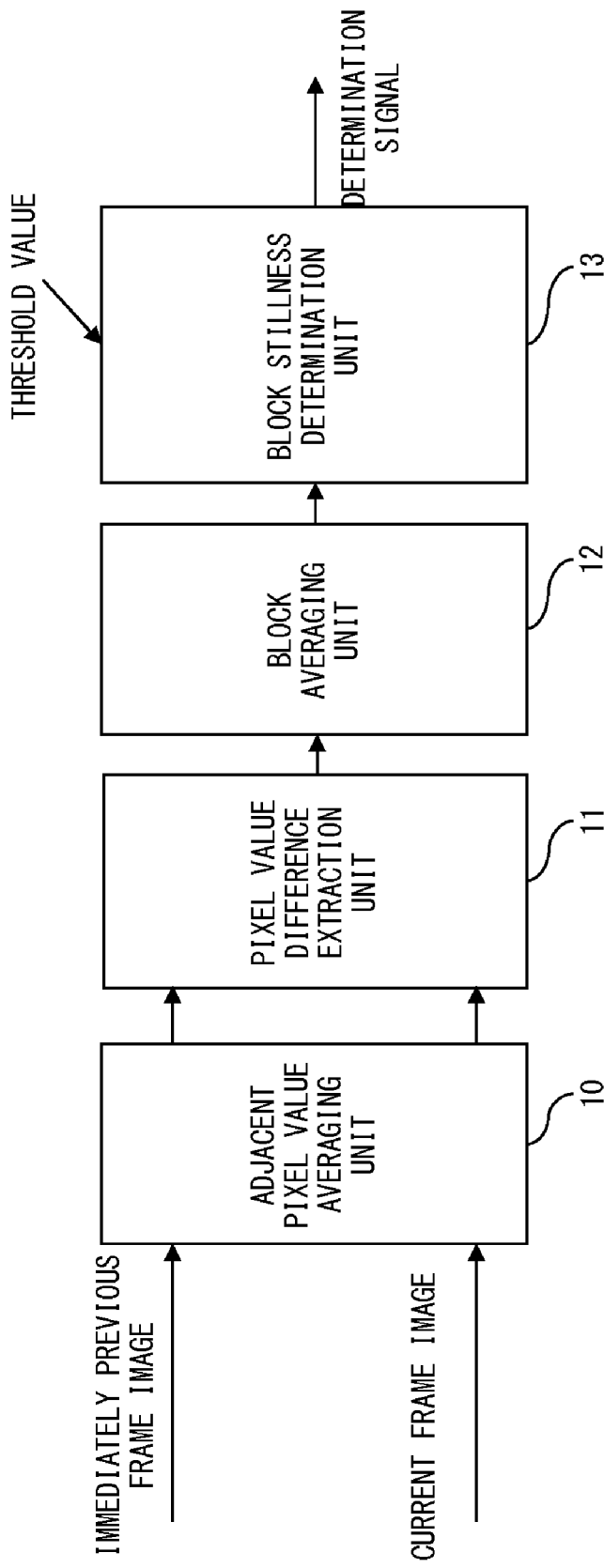
FIG. 4 shows the detailed configuration of the image still area determination device.

FIG. 4 shows the detailed configuration of the image still area determination device. The image still area determination device shown in FIG. 4 comprises an adjacent pixel value averaging unit 10, a pixel value difference extraction unit 11, a block averaging unit 12 and a block stillness determination unit 13. When compared with the conventional device shown in FIG. 1, the image still area determination device basically differs from it in that an adjacent pixel value averaging unit 10 is added. The still area determination unit set forth in the claims 4 and 5 in "What is claimed is:" of the present invention corresponds to the block averaging unit 12 and block stillness determination unit 13.

Figure 1:
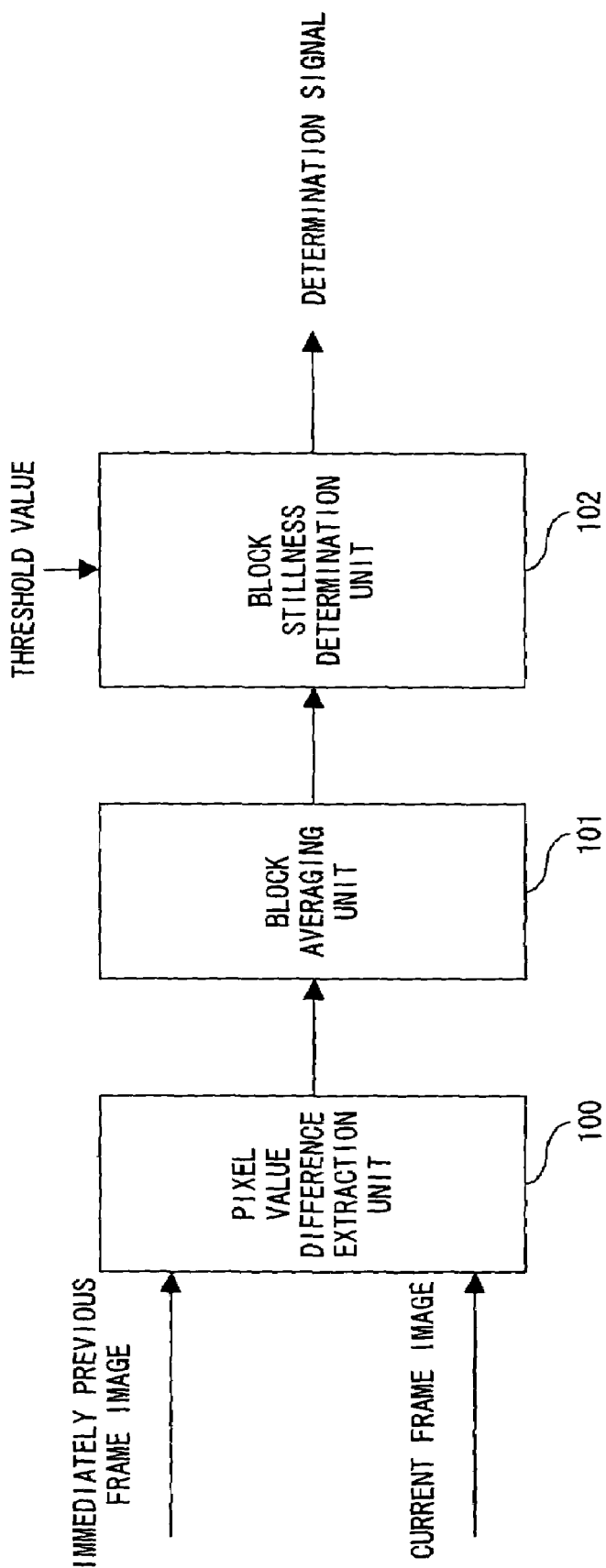
FIG. 1 shows the configuration of the conventional image still area determination device.
Figure 2:
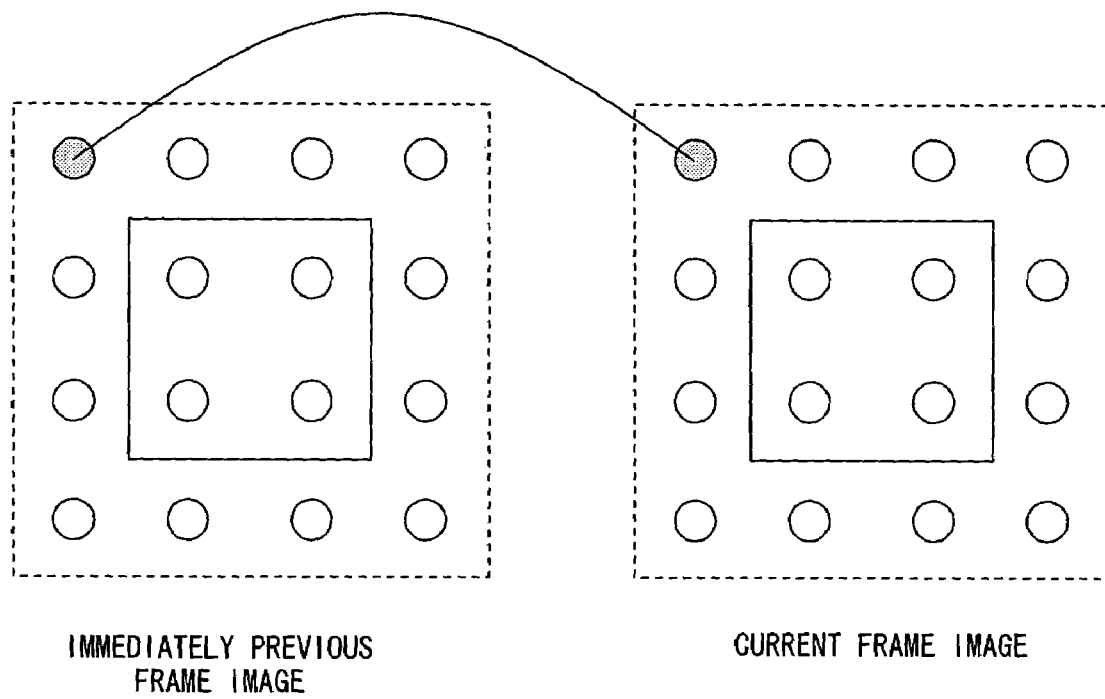
FIG. 2 explains the conventional image still area determination method.

The pixel value difference extraction unit 11, as in the case of conventional device shown in FIG. 1, calculates the difference between the average values of the pixel values of each pixel in the same positions of each of the current frame image and a frame image immediately before it. The block averaging unit 12 averages the output of the pixel value difference extraction unit 11 corresponding to each pixel in a block composed of n×n pixels, for example, 2×2 pixels in a square area, that is, the values of pixel value differences between a pair of pixels of each block. The block stillness determination unit 13 compares the output of the block averaging unit 12 with a predetermined threshold value, determines whether the image of the block is still and outputs the result as a determination signal.

This preferred embodiment is most unique in that the difference value of a pair of corresponding pixels of two frames, inputted to the pixel value difference extraction unit 11 is the average value of the values of not only the pixel but also pixels including adjacent pixels. Specifically, the adjacent pixel value averaging unit 10 provides the pixel value difference extraction unit 11 with the average value of the values of pixels including pixels adjacent to the target pixel as the value of a pair of pixels in the same target position in each of the current frame image and the frame image immediately before it.

Figure 5:
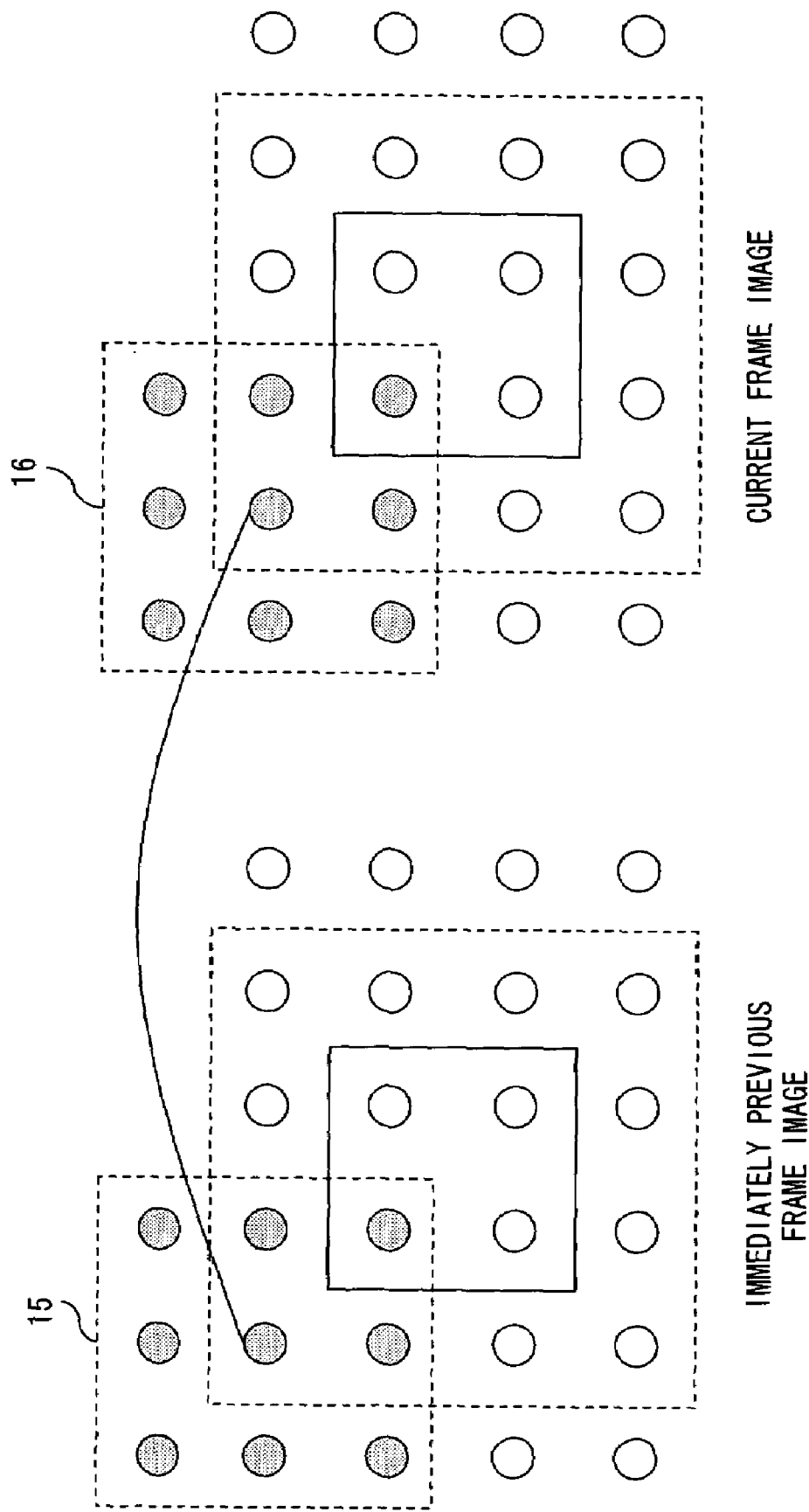
FIG. 5 explains the adjacent pixel value averaging method of the first preferred embodiment.

FIG. 5 explains the adjacent pixel value averaging method in the first preferred embodiment of the present invention. In FIG. 5, when the image still area determination device shown in FIG. 4 determines the stillness of a block composed of 2×2 pixels enclosed by a solid line near the center, the average value of pixel value differences of each of 4×4 pixels (enclosed by a dotted line) including a total of 12 pixels adjacent to the block, between the current frame image and a frame image immediately before it is calculated, the difference between the average values of two frames is compared with the threshold value, and a still area is determined.

As described above, when calculating the pixel value difference of each of the 4×4 pixels, between the current frame image and a frame image immediately before it, in this preferred embodiment, the pixel value is calculated by calculating the averaged pixel value difference of the target pixel including pixels adjacent to the current target pixel, instead of directly calculating the difference between the pixel values, and a difference between the current frame image and a frame image immediately before it, using the averaged pixel value.

Specifically, in FIG. 5, the current target pixel is located in the top left-hand corner of a 4×4 area including one pixel around a block composed of the above-mentioned 2×2 pixels. In the first preferred embodiment, the average values of the values of pixels in an area composed of nine pixels including eight pixels adjacent to the target pixel, that is, an area 16 in the current frame image and an area 15 in the frame image immediately before it are calculated, and the pixel value difference extraction unit 11 calculates the difference between these two average values.

In the first preferred embodiment, the adjacent pixel value averaging unit 10 performs the averaging according to the following equation. This equation calculates the average (pixel) value of the value $X(i, j)$ of a pixel whose transverse and vertical coordinates are i and j, respectively. In this equation, the summed result of pixel values is divided by eight instead of nine, which is the number of pixels in order to simplify the hardware configuration of the device, $$\text{Average value} = \{X(i-1,j-1) + X(i,j-1) + X(i+1,j-1) + X(i-1,j) + X(i,j) + X(i+1,j) + X(i-1,j+1) + X(i,j+1) + X(i+1,j+1)\}/8$$

The pixel value difference extraction unit 11 calculates a difference between average pixel values calculated by the adjacent pixel value averaging unit 10 of a pair of pixels in the same position in each of the current frame image and the frame image immediately before it as shown in FIG. 5, for example, the $Xp(i, j)$ of the current frame image and the $Xr(i, j)$ of the frame image immediately before it as follows.

$$\text{Pixel value difference} = Xp(i,j) - Xr(i,j)$$

As described earlier, the block averaging unit 12 accumulates differences between pixel average values in a square area composed of 4×4 pixels, outputs the average value as the average value of a block composed of 2×2 pixels. The block stillness determination unit 13 compares the average value with a threshold value, and if the average value is smaller than the threshold value, it determines that the block is a still area.

Figure 7:
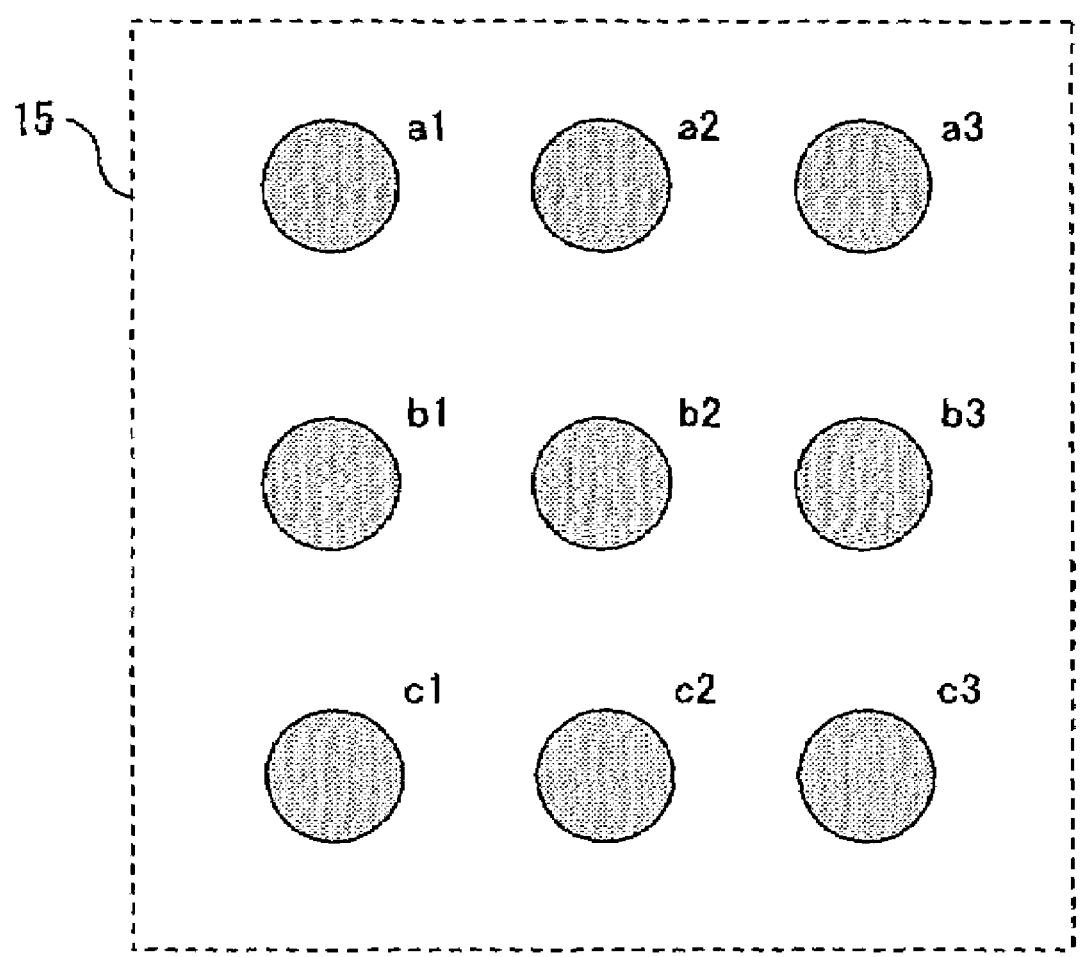
FIG. 7 shows examples of pixel values used to explain the adjacent pixel value averaging method of the first preferred embodiment.

FIG. 6 shows the configuration of the adjacent pixel value averaging unit 10 in the first preferred embodiment. The operation of this adjacent pixel value averaging unit is described below with reference to an example of the pixel configuration shown in FIG. 7 and the operational timing chart shown in FIG. 8. In FIG. 6, the adjacent pixel value averaging unit 10 comprises six data flip-flops (D-FFs) 21-26, two adders 27, 28, and a divider 29. In FIG. 7, it is assumed that an area 15 or 16 composed of nine pixels shown in FIG. 5 are composed of pixels each with one of pixel values, a1-a3, b1-b3 or c1-c3.

Figure 8:
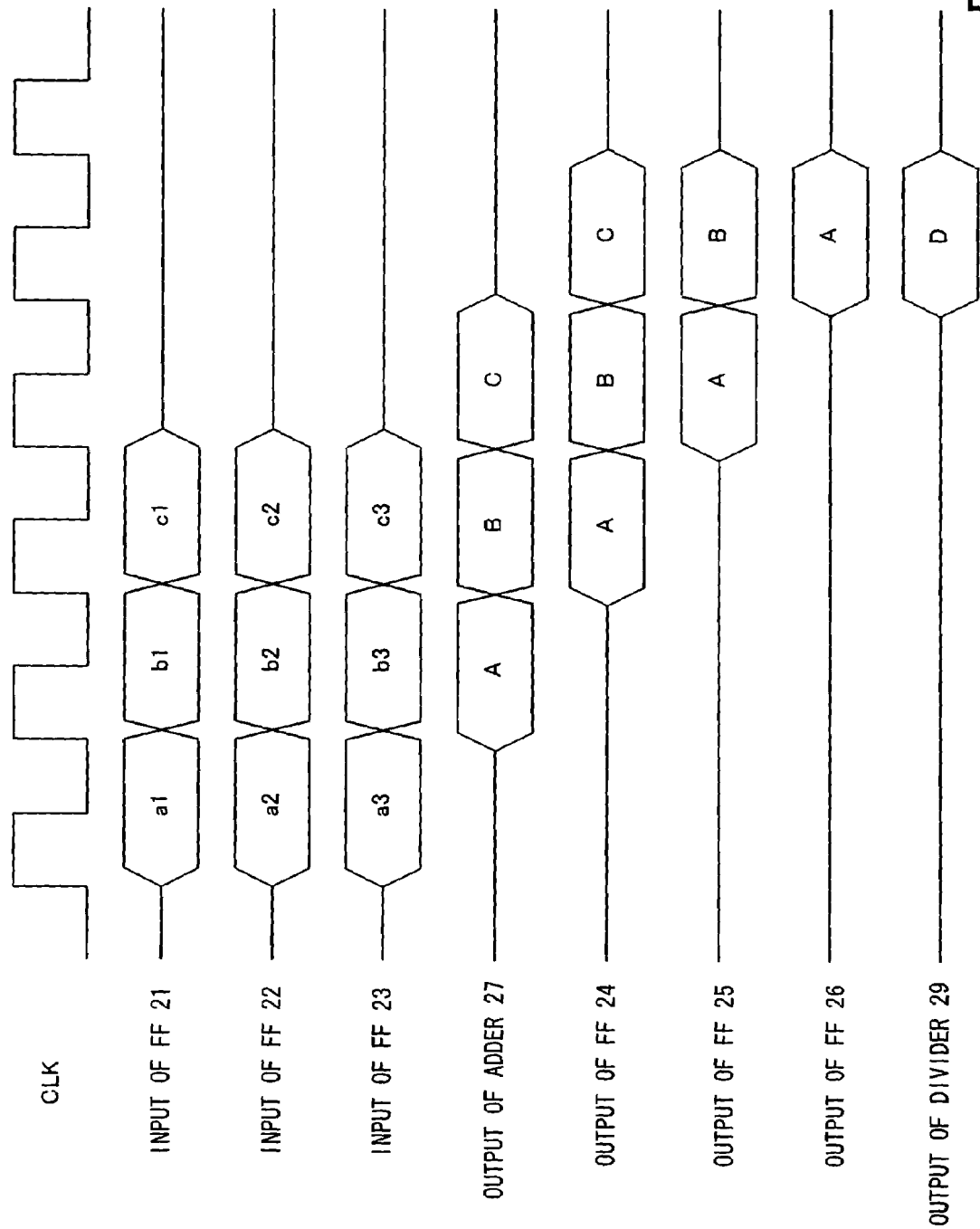
FIG. 8 is a timing chart showing the adjacent pixel value averaging operation of the first preferred embodiment.

As shown in the operational timing chart of FIG. 8, firstly, when the first clock is inputted, three pixel values on the top line in FIG. 7, a1-a3 are inputted to three D-FFs 21-23, respectively. Then, at a subsequent clock, the outputs of the three D-FFs 21-23 are inputted to the adder 27, and as a result of the addition, "A" is obtained. Simultaneously, the pixel values on the second line in FIG. 7, b1-b3 are inputted to the D-FFs 21-23, respectively.

At a subsequent clock, the adder 27 outputs the added result "B" of the three pieces of pixel data b1-b3, and the three pixel values on the bottom line in FIG. 7, c1-c3 are inputted to the D-FFs 21-23, respectively. In this case, the added result "A" of the adder 27 at the immediately previous clock is stored in a D-FF 24, and this added result is inputted from the D-FF 24 to a D-FF 25.

Furthermore, at a subsequent clock, the adder 27 outputs the added result of "C" of three pixel values c1-c3 to the D-FF 24. Simultaneously, the data "B" is outputted from the D-FF 24 to the D-FF 25, and the data "A" is outputted from the D-FF 25 to a D-FF 26.

Lastly, the data "C", "B" and "A" are outputted to an adder 28 from the D-FFs 24, 25 and 26, respectively, and the added result is inputted to the divider 29. Then, the divided result "D" of the divider 29 is outputted, for example, as the pixel value average value of a pixel in the top left-hand corner of the square composed of 4×4 pixels shown in FIG. 5.

Figure 9:
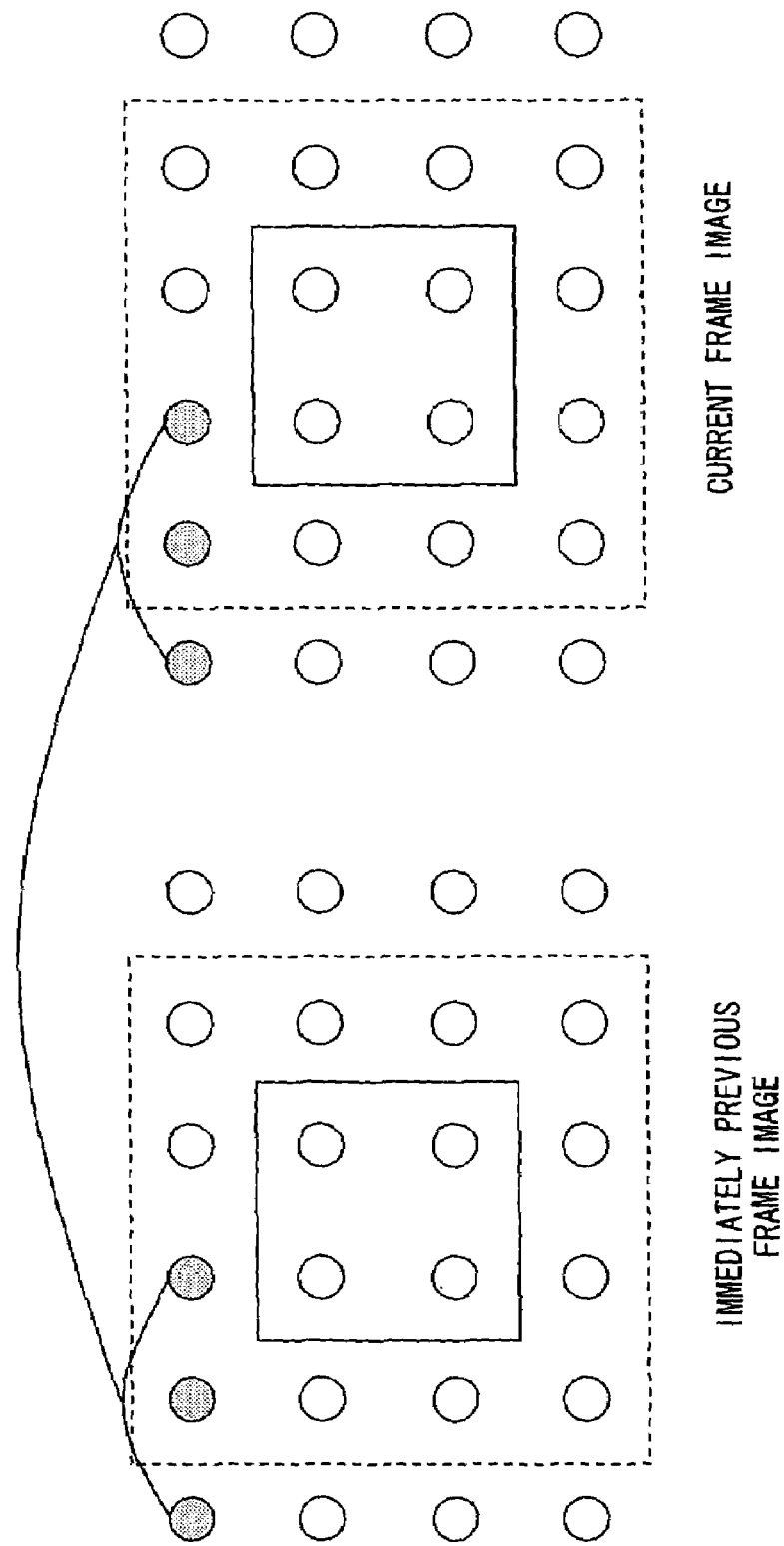
FIG. 9 explains the adjacent pixel value averaging method of the second preferred embodiment.
Figure 11:
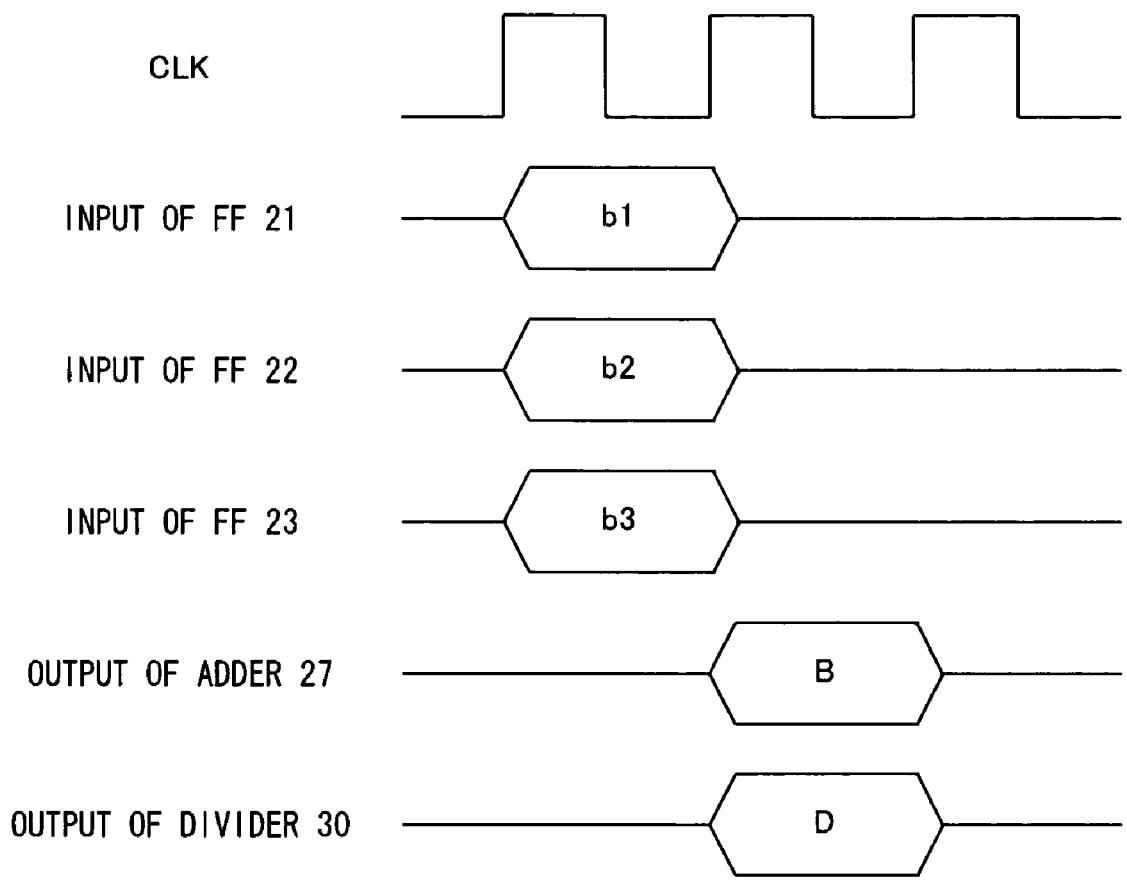
FIG. 11 is a timing chart showing the adjacent pixel value averaging operation of the second preferred embodiment.

FIGS. 9 through 11 explain the adjacent pixel value averaging method of the second preferred embodiment. FIG. 9 explains the basic averaging method of the second preferred embodiment. In the first preferred embodiment shown in FIG. 5, attention is paid to a pixel in the top left-hand corner of a square area composed of 4×4 pixels and averaging is applied to pixels including all adjacent pixels. However, in the second preferred embodiment, averaging is applied to three values of pixels including the right- and left-hand pixels adjacent to a pixel in the top left corner. Therefore, the average value is calculated as follows.

$$\text{Average value} = \{X(i-1,j) + X(i,j) + X(i+1,j)\}/4$$

In this equation too, the added result of pixels is divided by four in order to simplify the hardware configuration.

FIG. 10 shows the configuration of the adjacent pixel value averaging unit of the second preferred embodiment. The adjacent pixel value averaging unit 10 shown in FIG. 10 comprises three D-FFs 21-23, an adder 27 and a divider 30.

FIG. 11 is a timing chart showing the adjacent pixel value averaging operation of the second preferred embodiment. In this operational timing chart it is assumed that a pixel value averaging process is applied to, for example, three pixels on the center line of nine pixels shown in FIG. 7. Firstly, at the first clock, three pixel values b1-b3 are inputted to three D-FFs 21-23, respectively. Then, at a subsequent clock, the adder 27 outputs the added result of the data "B", and the divider 30 outputs an average value "D".

The image still area determination method of the present invention is applicable to various fields requiring the determination of a still area between two images. Here, as the applied preferred embodiment of this image still area determination method, interlace-progressive (IP) conversion process for converting an interlace scan image into a progressive scan image, for example, in the field of MPEG video encoding is described below with reference to FIGS. 12 through 14.

An interlace scan method is used, for example, in an NTSC type television, and displays an image by dividing a screen into, for example, two screens of one composed of scan lines with odd numbers from the top and one composed of scan lines with even numbers. However, a progressive scan method scans all the lines of one screen at once and is thus also called a non-interlace (de-interlace) scan method.

Figure 12:
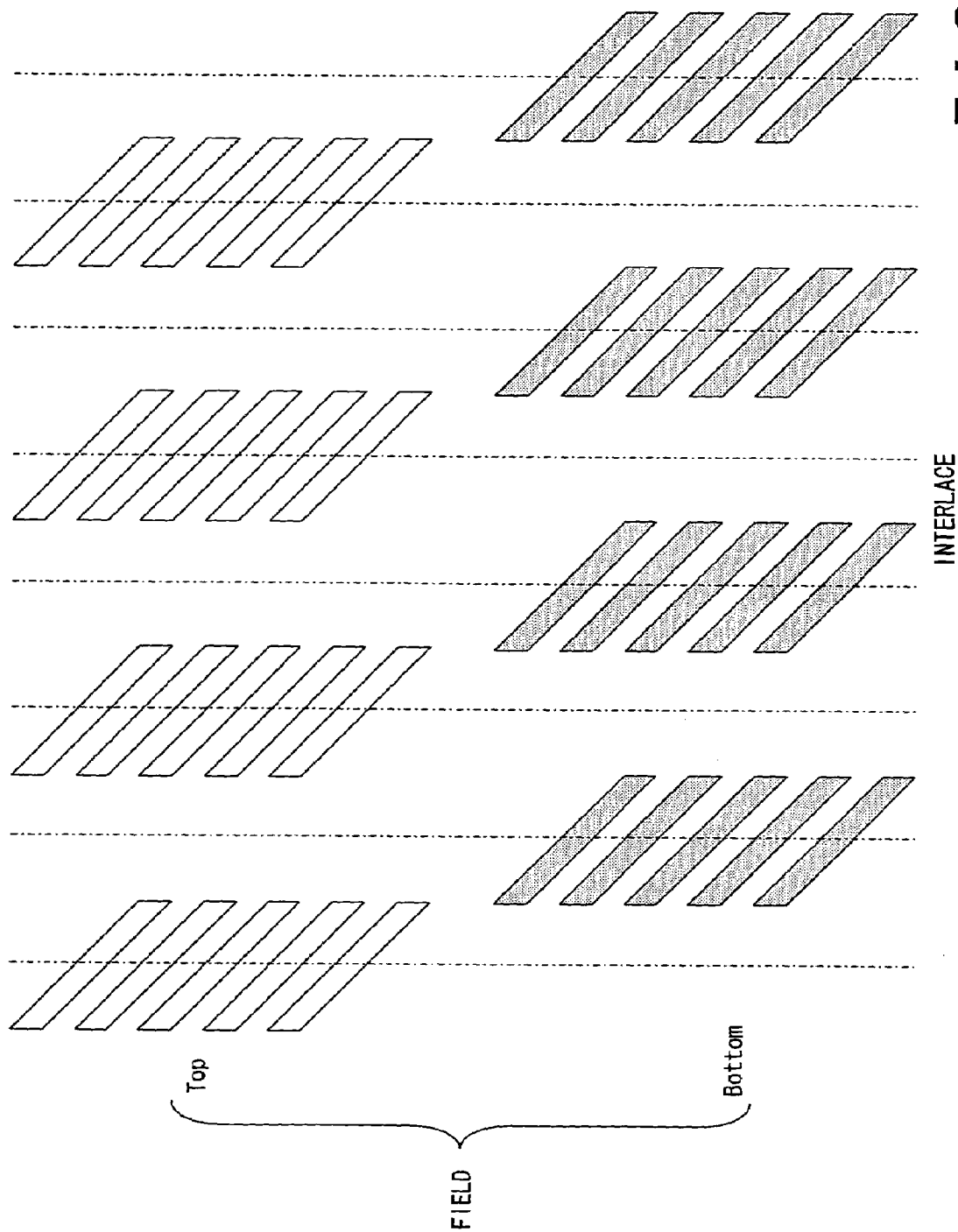
FIG. 12 explains an interlace scan type field image.

FIGS. 12 and 13 explain interlace and progressive scan type image output methods, respectively. In FIG. 12, one image is divided into, for example, a top field image corresponding to scan lines with odd numbers and a bottom field image corresponding to scan lines with even numbers, which are alternately outputted on a time axis (transverse) direction, for example, every 1/60 of a second.

However, in the progressive scan method, one image is sequentially outputted from the top as a frame image without being separated. By combining interlace scan images outputted every 1/60 of a second, a progressive scan image can be obtained every 1/30 of a second.

Figure 14:
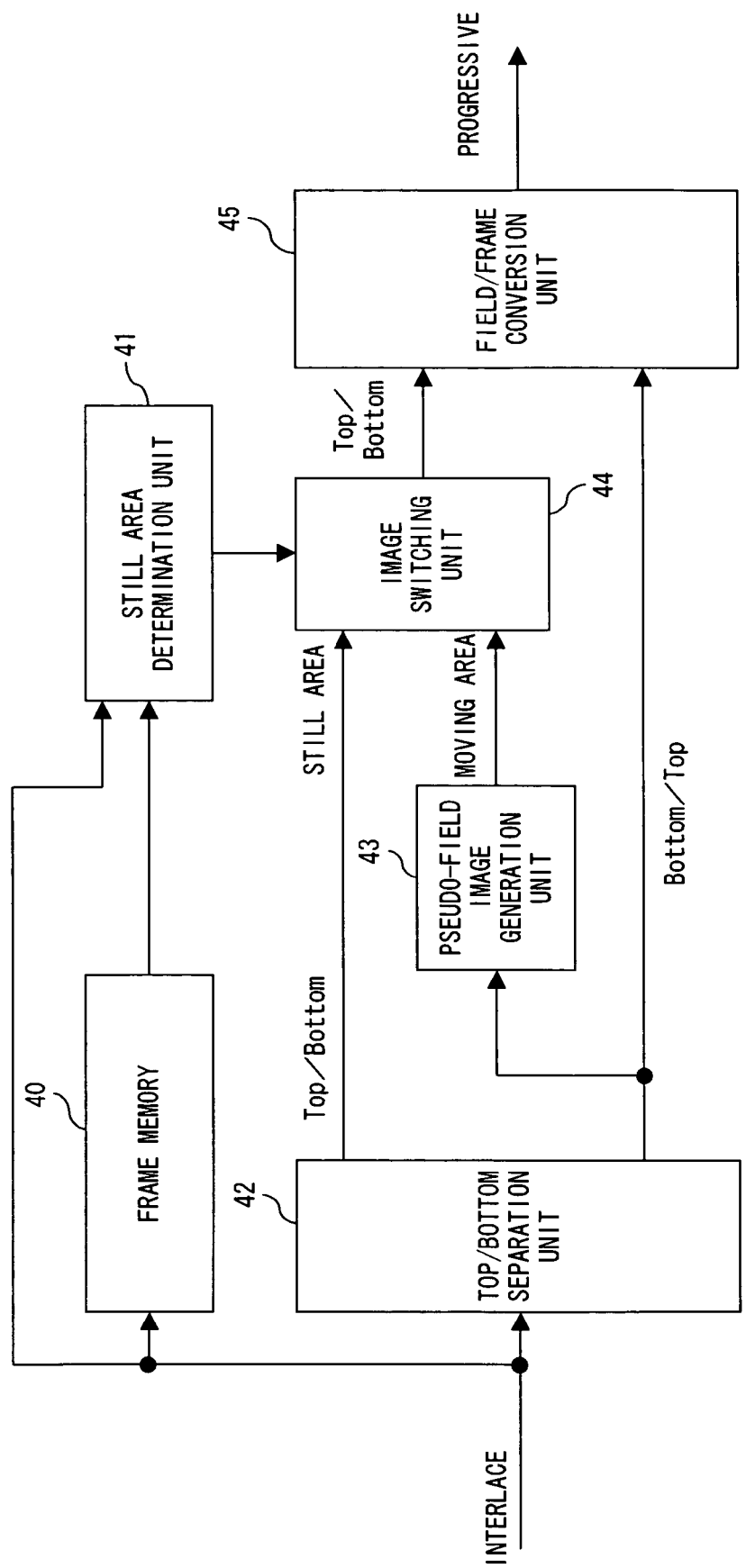
FIG. 14 shows an example of the configuration of an interlace-progressive image conversion system.

FIG. 14 shows the configuration of an interlace-progressive (IP) conversion processing system for converting an interlace scan type field image into a progressive scan type frame image. The conversion processing system shown in FIG. 14 comprises frame memory 40 for storing an immediately previous frame image, a still area determination unit 41 for determining the still area of an image, using the current frame image and frame image immediately before it stored in the frame memory 40, a top/bottom separation unit 42 for dividing an inputted interlace scan type field image into top and bottom fields, a pseudo-field image generation unit 43 provided with a field image time-lagged in the transverse direction in FIG. 12, that is, the time axis direction, an image switching unit 44 provided with a time-ahead top/bottom field image and the output of the pseudo-field image generation unit 43, for outputting one of the two images, according to the determination result of the still area determination unit 41, a field/frame conversion unit 45 provided with the output of the image switching unit 44 and a time-lagged top/bottom field image, for outputting a progressive image. The image still area determination device of the present invention described with reference to FIG. 4 corresponds to the still area determination unit 41 of this system.

In FIG. 14, an interlace scan type field image is inputted, that is, top and bottom field images are alternately inputted, a time-ahead field image is inputted to the image switching unit 44 and a time-lagged field image is inputted to the pseudo-field image generation unit 43 and the field/frame conversion unit 45. The pseudo-field image generation unit 43 generates a time-ahead pseudo-field image by motion compensation, such as interpolation or the like, when there is movement and inputs it to the image switching unit 44.

As described earlier, the still area determination unit 41, for example, determines a still area for each block, using the immediately previous frame image stored in the frame memory 40 and the current frame image combined with a field image inputted by the interlace scan method and outputs a determination signal outputted by the block stillness determination unit 13 shown in FIG. 4 to the image switching unit 44 as an image switching control signal. If it is determined that the block is still, the image switching unit 44 outputs the image outputted from the top/bottom separation unit 42 to the field/frame conversion unit 45. If it is not determined that the block is still, the image switching unit 44 outputs the image generated by the pseudo-field image generation unit 43 to the field/bottom frame conversion unit 45. The field/frame conversion unit 45 combines the time-lagged field image with the time-ahead field image itself or the image outputted by the pseudo-field image generation unit 43 and outputs the combined image as a progressive image.

AS described above, in the present invention, for example, in a conversion processing system for converting an interlace scan type field image into a progressive scan type frame image, by averaging pixel values not only between directly corresponding pixels of the current frame image and a frame image immediately before it, but also including pixels adjacent to the relevant pixel and determining the still area of the image, an area which should be still can be prevented from being not still due to the small movement in its interlace-progressive conversion process even when there is imperceptible small movement, thereby reducing the flicker and blur of a still area. This fact can be verified against an actual image.

What is claimed is:

1. An image still area determination device, comprising:
    an adjacent pixel value averaging unit for calculating an average value of values of the relevant pixel and pixels adjacent to the pixel in each of two frames when a current frame image and a frame image immediately before it are inputted;
    a pixel value difference extraction unit for calculating a difference between the average values of values of a pair of pixels in the same position of each of the two frame images; and
    a still area determination unit for determining a still area of each of the two frame images, using an output of the pixel value difference extraction unit and a predetermined threshold value.

2. The image still area determination device according to claim 1, wherein
    said adjacent pixel value averaging unit calculates an average value of values of the pixel and eight pixels adjacent to the pixel on a pixel plane.

3. The image still area determination device according to claim 1, wherein
    said adjacent pixel value averaging unit calculates an average value of values of the pixel and two right- and left-hand pixels adjacent to the pixel on a pixel plane.

4. The image still area determination device according to claim 1, wherein said still area determination unit determines a still area of a block composed of n×n pixels in a square area located in the same position of each of the two frame images, using an output of the pixel value difference extraction unit.

5. The image still area determination device according to claim 4, wherein said still area determination unit determines of a still area of an area obtained by adding adjacent pixels around the block to a block composed of n×n pixels in the square area, and specifies the determination result as a stillness determination result of the block.

6. The image still area determination device according to claim 1, which is used to convert interlace scan type field image into a progressive scan type frame image.

* * * * *